(12) United States Patent
Lee et al.

(10) Patent No.: US 12,540,154 B2
(45) Date of Patent: Feb. 3, 2026

(54) GLUCOSAMINE DERIVATIVE NANOPARTICLE AND PREPARATING METHOD AND USE THEREOF

(71) Applicant: CPC Corporation, TAIWAN, Kaohsiung (TW)

(72) Inventors: Hsiao-Ping Lee, Chiayi (TW); Chien-Chung Cheng, Taipei (TW); Jeen-Kuan Chen, Chiayi (TW); Hsin-Yi Lee, Chiayi (TW)

(73) Assignee: CPC CORPORATION, TAIWAN, Kaohsiung (TW)

( * ) Notice: Subject to any disclaimer, the term of this patent is extended or adjusted under 35 U.S.C. 154(b) by 443 days.

(21) Appl. No.: 18/117,706

(22) Filed: Mar. 6, 2023

(65) Prior Publication Data

US 2024/0228525 A1   Jul. 11, 2024

(30) Foreign Application Priority Data

Jan. 10, 2023   (TW) .................................. 112101111

(51) Int. Cl.
*C07H 1/00* (2006.01)
*B82Y 5/00* (2011.01)
*C07K 7/06* (2006.01)

(52) U.S. Cl.
CPC .................. *C07H 1/00* (2013.01); *B82Y 5/00* (2013.01); *C07K 7/06* (2013.01)

(58) Field of Classification Search
CPC ..... C07K 7/06; A61K 31/7008; A61K 9/5169
See application file for complete search history.

(56) References Cited

U.S. PATENT DOCUMENTS

| | | |
|---|---|---|
| 5,846,852 A | 12/1998 | Limper-Brenner et al. |
| 9,856,290 B2 | 1/2018 | Clark et al. |
| 2005/0113287 A1 | 5/2005 | Nelson |

FOREIGN PATENT DOCUMENTS

| | | | |
|---|---|---|---|
| CN | 105920612 A | 9/2016 | |
| CN | 107080703 A | 8/2017 | |
| JP | 2013-522220 A | 6/2013 | |
| WO | WO-2023099922 A1 * | 6/2023 | ............... C07K 7/06 |

OTHER PUBLICATIONS

Mortazavi, S.M., et al., "Skin permeability, a dismissed necessity for anti-wrinkle peptide performance.", International Journal of Cosmetic Science, 2022年(year), vol. 44, pp. 232-248, DOI: 10.1111/ics.12770.
Yang, Y., et al., "Application of peptides in construction of nonviral vectors for gene delivery.", Nanomaterials, 2022年(year), vol. 12, 4076 (22 pages), DOI: 10.3390/nano12224076.
Cho Lee, A.R., "Microneedle-mediated delivery of cosmeceutically relevant nucleoside and peptides in human skin: challenges and strategies for dermal delivery.", Journal of Pharmaceutical Investigation, 2019年(year), vol. 49, pp. 587-601, DOI: 10.1007/s40005-019-00438-y.
Japan Patent Office Official action on Feb. 20, 2024.
Mohan, Tamilselvan, Karin Stana Kleinschek, and Rupert Kargl. Polysaccharide peptide conjugates chemistry, properties and applications. Carbohydrate Polymers 280( 2022) 118875.
Taiwan Intellectual Property Office Official action & Search report on Sep. 13, 2023.
Matrixyl (TM), "The Messenger Peptide for Dermal Matrix Repair: an Alternative to Retinol and Vitamin C", Mar. 27, 2003, XP-002762451.
European Patent Office Search report on Aug. 18, 2023.

* cited by examiner

*Primary Examiner* — Jonathan S Lau
(74) *Attorney, Agent, or Firm* — WPAT, PC

(57) ABSTRACT

The present invention discloses a glucosamine derivative nanoparticle and preparation method and use thereof. By self-assembling glucosamine derivatives and ethanol into the form of nanoparticles, the skin penetration rate and cell absorption rate of glucosamine are improved, and at the same time the toxicity to cells and organisms is reduced. The problem of poor absorption of glucosamine is improved by using glucosamine derivative nanoparticles. Furthermore, the glucosamine derivative nanoparticles can be used as a delivery carrier to cover and bring the specified ingredients into the cells or stratum corneum, and to increase the skin penetration rate and cell absorption rate of the specified ingredients.

8 Claims, 12 Drawing Sheets

Specification includes a Sequence Listing.

GLUCOSAMINE DERIVATIVE NANOPARTICLE AND PREPARATING METHOD AND USE THEREOF

BACKGROUND OF THE INVENTION

The present invention relates to a glucosamine derivative nanoparticle, especially to a glucosamine derivative nanoparticle, a method of preparing the same, and use thereof.

STATEMENT REGARDING SEQUENCE LISTING

The sequence listing associated with this application is provided in text format in lieu of a paper copy and is hereby incorporated by reference into the specification. The name of the XML file containing the sequence listing is sl.xml. The XML file is 3,558 bytes; was created on Aug. 11, 2025; and is being submitted electronically via Patent Center.

PRIOR ART

Glucosamine is a naturally occurring amino monosaccharides, existing in connective tissue, cartilage, ligaments, and other tissues and used as materials for synthesis of glycosaminoglycan and proteoglycan in the bodies. The glycosaminoglycan and proteoglycan, as main components of cellular matrix and hyaluronic acid, are highly associated with not only moisture content and elasticity of skin but also health of articular cartilage because they help to keep strength, flexibility, and elasticity of the above tissues and organs and make the connective tissue more health.

However, bioavailability of glucosamine taken by oral administration is quite low (about 19~26%) because the glucosamine reaches the connective tissue to be used by cells only after liver metabolism and blood circulation.

Moreover, glucosamine applied to the skin also has limited absorption due to the stratum corneum. Although the absorption can be improved by increasing the glucosamine concentration. Yet the glucosamine with high concentration lead to cell cytotoxicity so that administration dose and method of the glucosamine are limited.

Thus there is an urgent need to improve cellular uptake of glucosamine without causing toxicity to cells.

SUMMARY OF THE INVENTION

Therefore, it is a primary object of the present invention to provide a glucosamine derivative nanoparticle, a method for preparing the same, and uses thereof. After self-assembly of glucosamine derivatives with alcohol to form nanoparticles, not only skin permeability and cellular uptake of glucosamine are improved, cytotoxicity of glucosamine is also reduced.

In order to achieve the above object, a method of preparing glucosamine derivative nanoparticles includes the following steps. In the beginning, dissolve a glucosamine derivative in deionized water to form a glucosamine derivative aqueous solution. Then mix alcohol with the glucosamine derivative aqueous solution to get a mixed solution and vibrate the mixed solution by an ultrasonic vibrator with a power of 40-50 W for 5-10 minutes to get glucosamine derivative nanoparticles. The glucosamine derivative is formed by using a succinic anhydride connected with an amino end of a glucosamine to react with an amino end of a peptide. A chemical formula of the glucosamine derivative is as follows.

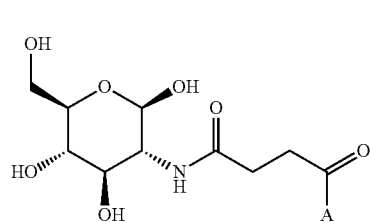

A is a peptide composed of 5-6 amino acids while the peptide is selected from the group consisting of a Lys-Thr-Thr-Lys-Ser (KTTKS, SEQ ID NO: 1), a Cys-Arg-Gly-Asp-Ser (CRGDS, SEQ ID NO: 2), and a Hexaarginine (RRRRRR, SEQ ID NO: 3).

A use of the glucosamine derivative nanoparticles is to carry a specific ingredient (such as glucosamine salt) to enter a cell or stratum corneum. The glucosamine derivative nanoparticles have specific interactions with the cell by a peptide thereof and the specific interactions can be recognition of specific receptors on surface of the cell (such as skin cell) by a peptide of the glucosamine derivative, electric charge attractions, changes in hydrophobicity, etc. so as to enter the cell or the stratum corneum. Thereby both skin permeability and cellular uptake of glucosamine salt are improved.

DETAILED DESCRIPTION OF THE INVENTION

In order to improve skin permeability and cellular uptake of glucosamine, a glucosamine derivative containing nanopartilces of the same, a method of preparing the same, and uses thereof according to the present invention are provided to address issues caused by conventional techniques.

The features, structures, and related methods are described in the following embodiments.

Figure 1:
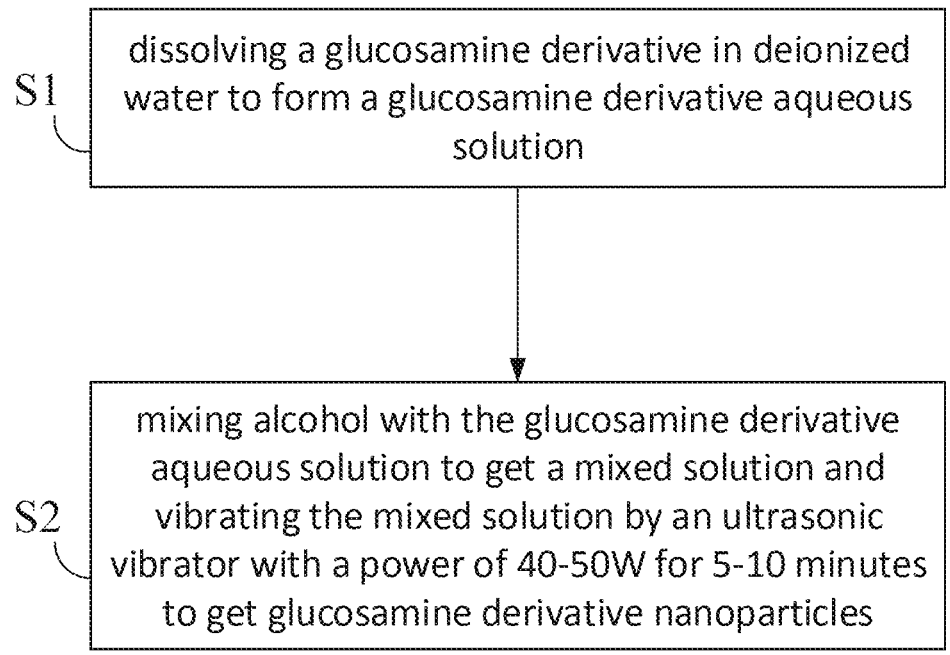
FIG. 1 is a flow chart showing steps of preparing glucosamine derivative nanoparticles of an embodiment according to the present invention.

Refer to FIG. 1, a method of preparing glucosamine derivative nanoparticles includes a plurality of steps.

S1: dissolving a glucosamine derivative in deionized water to form a glucosamine derivative aqueous solution; and S2: mixing alcohol with the glucosamine derivative aqueous solution to get a mixed solution and vibrating the mixed solution by an ultrasonic vibrator with a power of 40-50 W for 5-10 minutes to get glucosamine derivative nanoparticles.

A method of preparing a glucosamine derivative is provided before the step S1. The method of preparing the glucosamine derivative includes the following steps.

S11: adding glucosamine and succinic anhydride into dimethylformamide (DMF) aqueous solution and N-methylmorpholine at room temperature to react and performing vacuum filtration after reaction to form glucosamine-succinic anhydride;

S12: adding glucosamine-succinic anhydride and peptide separately into DMF to mix and react at room temperature and get yellow precipitate; and S13: performing suction, filtration, and centrifugation on the yellow precipitate to get the glucosamine derivative.

The glucosamine derivative according to the present invention is formed glucosamine to react with an amino end of a peptide. The following is chemical formula of the glucosamine derivative prepared by the above method.

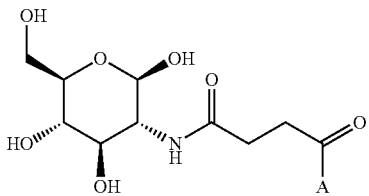

A is a peptide composed of 5-6 amino acids and prepared by a solid-phase synthesis method. In the present invention, the peptide is selected from the group consisting of a KTTKS (Lys-Thr-Thr-Lys-Ser, SEQ ID NO: 1), a CRGDS (Cys-Arg-Gly-Asp-Ser, SEQ ID NO: 2), and a RRRRRR (Hexaarginine, SEQ ID NO: 3), but not limited. Generally, the peptide can be a peptide with permeability and having 5-6 amino acids.

The step S1 further includes a step of: adding a glucosamine salt into deionized water. Thus a glucosamine derivative nanoparticle of the present invention (with a particle diameter ranging from 400 nm to 1000 nm) can carry more the glucosamine salt.

The followings are embodiments of the present invention (take the KTTKS(SEQ ID NO: 1), the CRGDS(SEQ ID NO: 2), and the RRRRRR(SEQ ID NO: 3) as an example respectively)

Embodiment One: Preparing the Glucosamine Derivative Nanoparticle (KTTKS, SEQ ID NO: 1)

First add glucosamine and succinic anhydride (both 1 mmol) with a molar ratio of 1:1 into a 2 neck flask containing a magnetic stirrer therein. Then add 10 ml dimethylformamide (DMF) aqueous solution (DMF:water (V/V)=9:1) and 0.2 ml N-methylmorpholine into the 2 neck flask in turn and react at room temperature for 12 hours. Remove the water and most of DMF by a high vacuum system and the rest solution is added with acetic acid for performing re-precipitation. Put the flask in a refrigerator at 4° C. overnight. After vacuum filtration, wash precipitate with cold ether and vacuum dry to get white solid which is a glucosamine-succinic anhydride (yield rate is about 85%).

Next place resin containing 0.3976 mmol KTTKS(SEQ ID NO: 1, prepared by the solid-phase synthesis method) into the flask and add 2 ml DMF. Then the flask is placed on a vibrator for 30 minutes. At the same time, place 1.394 mmol glucosamine-succinic anhydride into a sample bottle and add 2 ml DMF for dissolution. Then solution formed in the sample bottle is filled into the flask to react for 2 hours and perform ninhydrin test. Completion of the reaction is confirmed when the resin is yellow precipitate. Take the yellow precipitate containing the glucosamine derivative (KTTKS, SEQ ID NO: 1) out of the flask and perform vacuum filtration with glass filter. Next wash with alcohol and dichloromethane (DCM), collect the resin, and carry out vacuum drying. Add cleavage reagent (trifluroacetic acid:triisopropylsilane:water=95:2.5:2.5) to the dried resin and place into the vibrator at 150 rpm for 20 minutes. Then perform vacuum filtration with glass filter, collect filtrate, and use cold ether for crystallization and precipitation. Then the solution is transferred to a centrifuge tube for collecting solid. After removal of ether at an upper layer, add ether to wash precipitate and perform centrifugation, and run this process for 3 times. The solid is vacuum dried by the high vacuum system to get the glucosamine derivative which is Glu-SA-(KTTKS), white solid product with the yield rate of 94%.

Glu-SA-(KTTKS) is analyzed by $^1$H-NMR to confirm that Glu-SA-(KTTKS) is already produced.

$^1$H-NMR (300 MHz, D$_2$O): 4.33-4.17 (m, 4H), 4.16-4.01 (m, 3H), 3.78-3.69 (m, 2H), 3.69-3.26 (m, 6H), 2.84 (t, 4H), 2.46 (m, 2H), 1.81-1.46 (m, 8H), 1.40-1.21 (m, 4H), 1.05 (d, 6H), 0.67 (t, J=6.2 Hz, 3H).

Figure 2A:
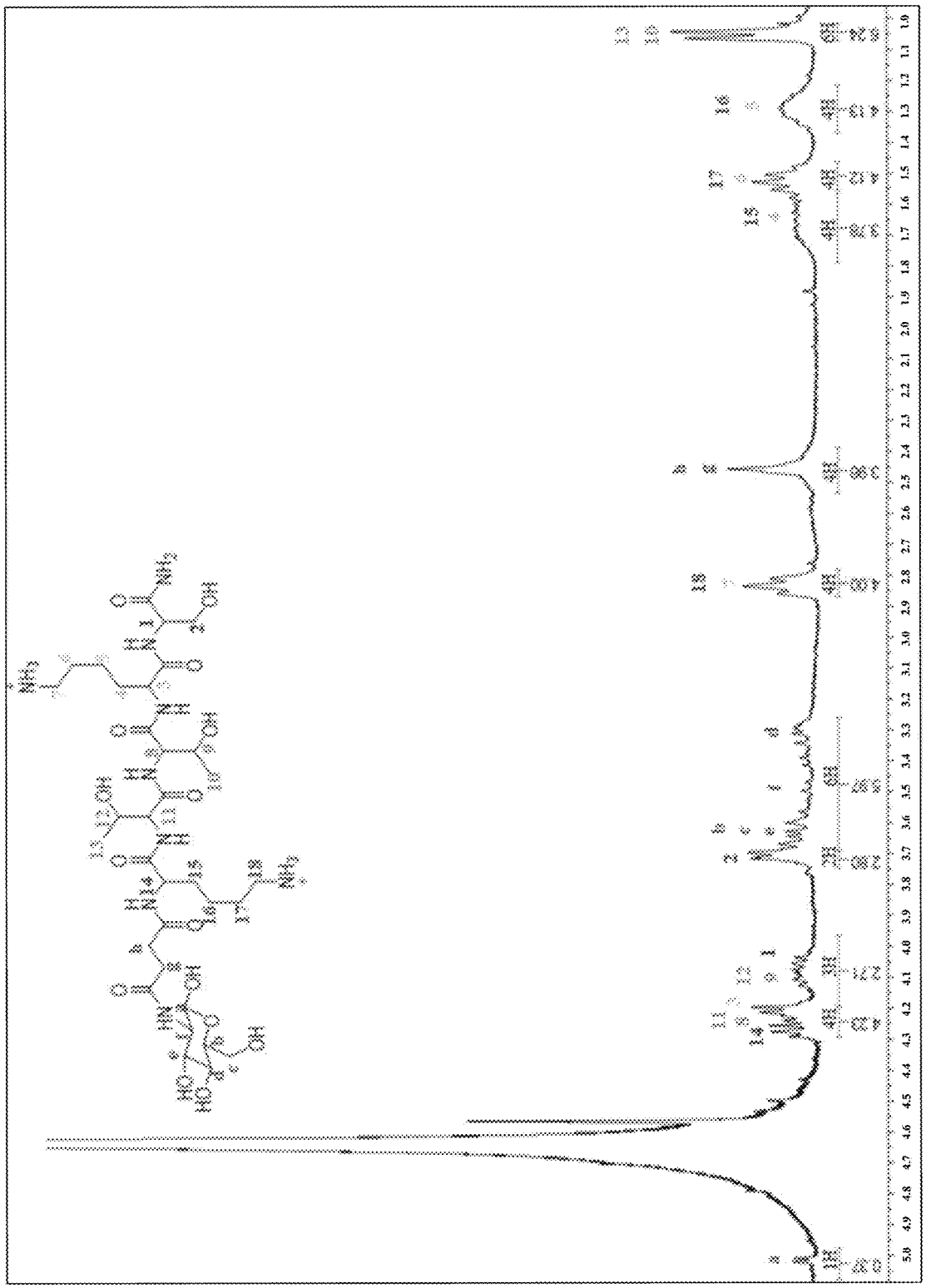
FIG. 2A is a $^1$H-NMR spectrum of a glucosamine derivative (KTTKS, SEQ ID NO: 1) of an embodiment according to the present invention.

An ethylene group linkage of the glucosamine derivative is shown at 2.5 ppm to confirm that the glucosamine is connected with specific amino groups of the peptide by covalent bonding. Hydrogen atoms on $^{14}$C and $^{15}$C which are originally connected with amino group (—NH2) are connected with the glucosamine derivative to form amide bond (—CONH—). This lead to chemical shift which supports formation of the covalent bond (as shown in FIG. 2A).

Figure 2B:
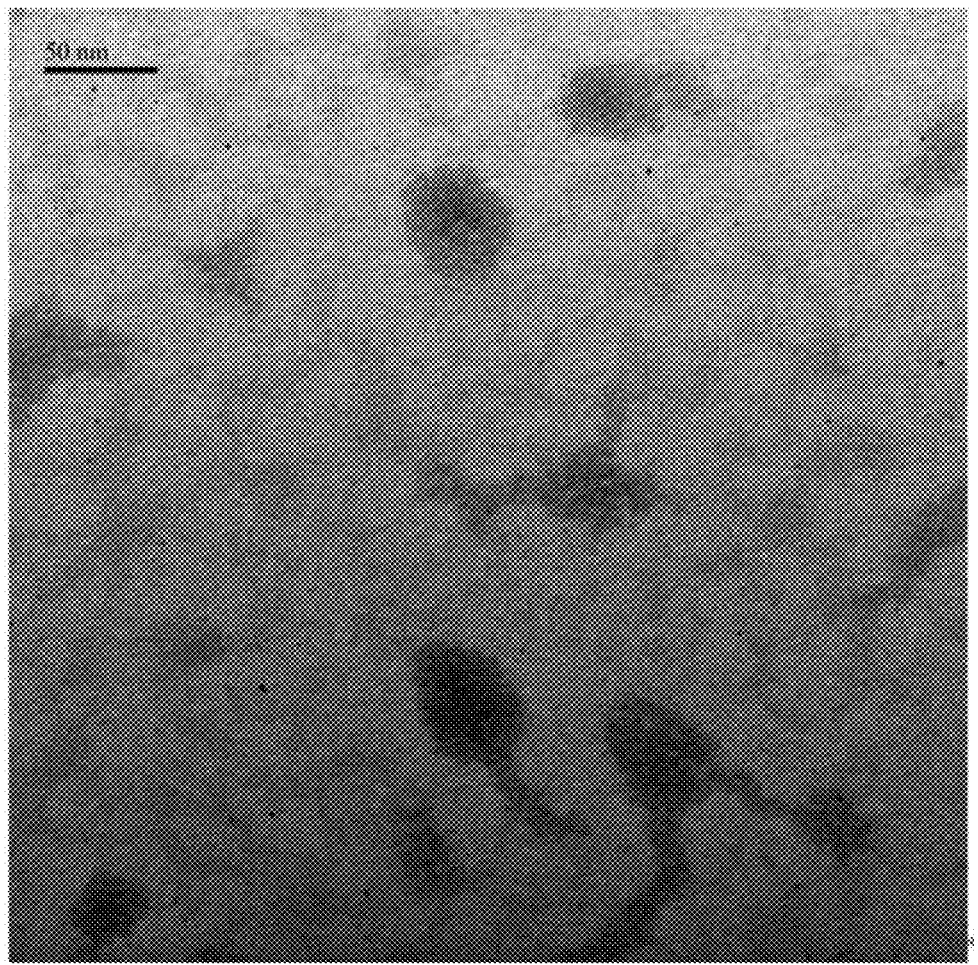
FIG. 2B is a transmission electron microscope (TEM) image of a glucosamine derivative (KTTKS, SEQ ID NO: 1) of an embodiment according to the present invention.

Lastly, dissolve 1 mg glucosamine derivative in 4 ml deionized water and inject 1 ml alcohol (95%) by using a 18 G syringe. Then the mixed solution is vibrated by an ultrasonic vibrator (probe ultrasonic vibration) at 42 W for 10 minutes to produce glucosamine derivative nanoparticles (the KTTKS(SEQ ID NO: 1) with particle size of 700-950 nm). First use an optical microscope for primary assessment and then use transmission electron microscope (TEM) to verify production of the glucosamine derivative. The result of observation is shown in FIG. 2B.

Embodiment Two: Preparation of Glucosamine Derivative Nanoparticle (CRGDS, SEQ ID NO: 2)

Put resin containing 0.1568 mmol CRGDS (SEQ ID NO: 2, prepared by the solid-phase synthesis method) into a flask and add 3 ml DMF. Then the flask is placed on a vibrator for 30 minutes. At the same time, place 0.6633 mmol glucosamine-succinic anhydride (the same as the embodiment one) into a sample bottle and add 4 ml DMF for dissolution. Then solution in the sample bottle is filled into the flask to react for 2 hours and perform ninhydrin test. Completion of the reaction is confirmed when the resin is the yellow precipitate.

Next take the yellow precipitate containing the glucosamine derivative (CRGDS, SEQ ID NO: 2) out of the flask and perform suction, filtration, and centrifugation (the same as the above embodiment 1 while vibration time is changed into 2 hours). The solid is dried by a high vacuum system to get the glucosamine derivative (which is Glu-SA-(CRGDS), white solid with the yield rate of 81%).

Glu-SA-(CRGDS) is analyzed by $^1$H-NMR to confirm production of Glu-SA-(CRGDS).

Figure 3A:
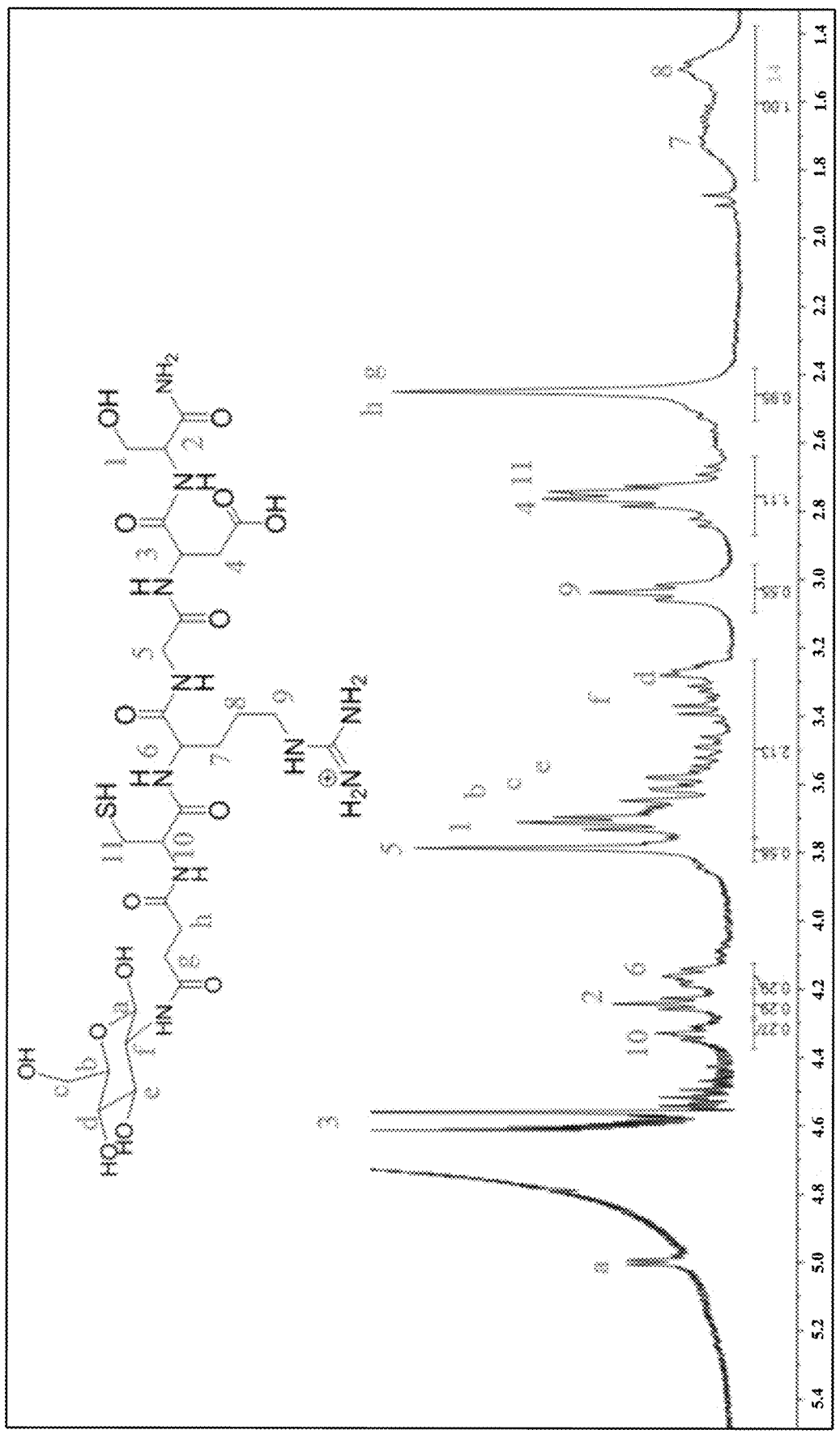
FIG. 3A is a $^1$H-NMR spectrum of a glucosamine derivative (CRGDS, SEQ ID NO: 2) of an embodiment according to the present invention.

$^1$H-NMR (300 MHz, D$_2$O) δ 4.56 (s, 1H), 4.33 (t, 1H), 4.25 (t, 1H), 4.17 (t, 1H) 3.79 (s, 2H), 3.72 (t, 2H), 3.04 (t, 2H), 2.75 (t, 2H), 2.46 (dd, 2H), 1.72 (m, 2H), 1.51 (m, 2H) (as shown in FIG. 3A).

Figure 3B:
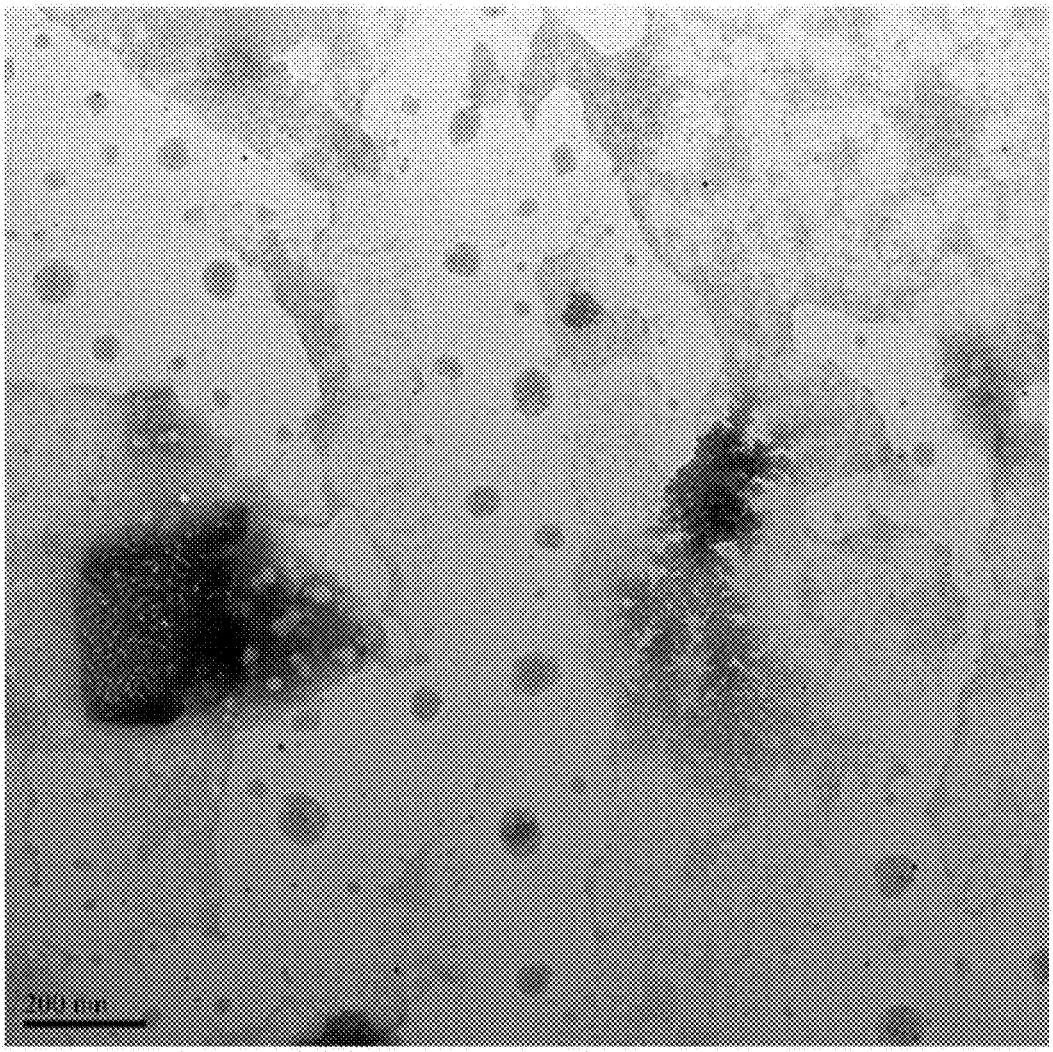
FIG. 3B is a transmission electron microscope (TEM) image of a glucosamine derivative (CRGDS, SEQ ID NO: 2) of an embodiment according to the present invention.

Lastly, dissolve 1 mg glucosamine derivative in 4 ml deionized water and inject 1 ml alcohol (95%) by using a 18 G syringe. Then the mixed solution is vibrated by an ultrasonic vibrator (probe ultrasonic vibration) at 42 W for 10 minutes to produce glucosamine derivative nanoparticles (the CRGDS(SEQ ID NO: 2) with particle size of 740-820 nm). First use an optical microscope for primary assessment and then use transmission electron microscope (TEM) to verify production of the glucosamine derivative. The result of observation is shown in FIG. 3B.

Embodiment Three: Preparing Glucosamine Derivative Nanoparticle (RRRRRR, SEQ ID NO: 3)

Place resin containing 0.2026 mmol RRRRRR (SEQ ID NO: 3, prepared by the solid-phase synthesis method) into a flask and add 2 ml DMF. Then the flask is placed on a vibrator for 30 minutes. At the same time, place 0.249 mmol glucosamine-succinic anhydride (the same as the embodiment one) into a sample bottle and add 2 ml DMF for dissolution. Then solution in the sample bottle is filled into the flask to react for 2 hours and perform ninhydrin test. Completion of the reaction is confirmed when the resin is the yellow precipitate.

Next take the yellow precipitate containing the glucosamine derivative (RRRRRR, SEQ ID NO: 3) out of the flask and perform suction, filtration, and centrifugation (the same as the above embodiment 1 while vibration time is changed into 2 hours). The solid is dried by a high vacuum system to get the glucosamine derivative (which is Glu-SA-(RRRRRR), white solid with the yield rate of 78%).

Glu-SA-(RRRRRR) is analyzed by $^1$H-NMR to confirm production of Glu-SA-(RRRRRR).

Figure 4A:
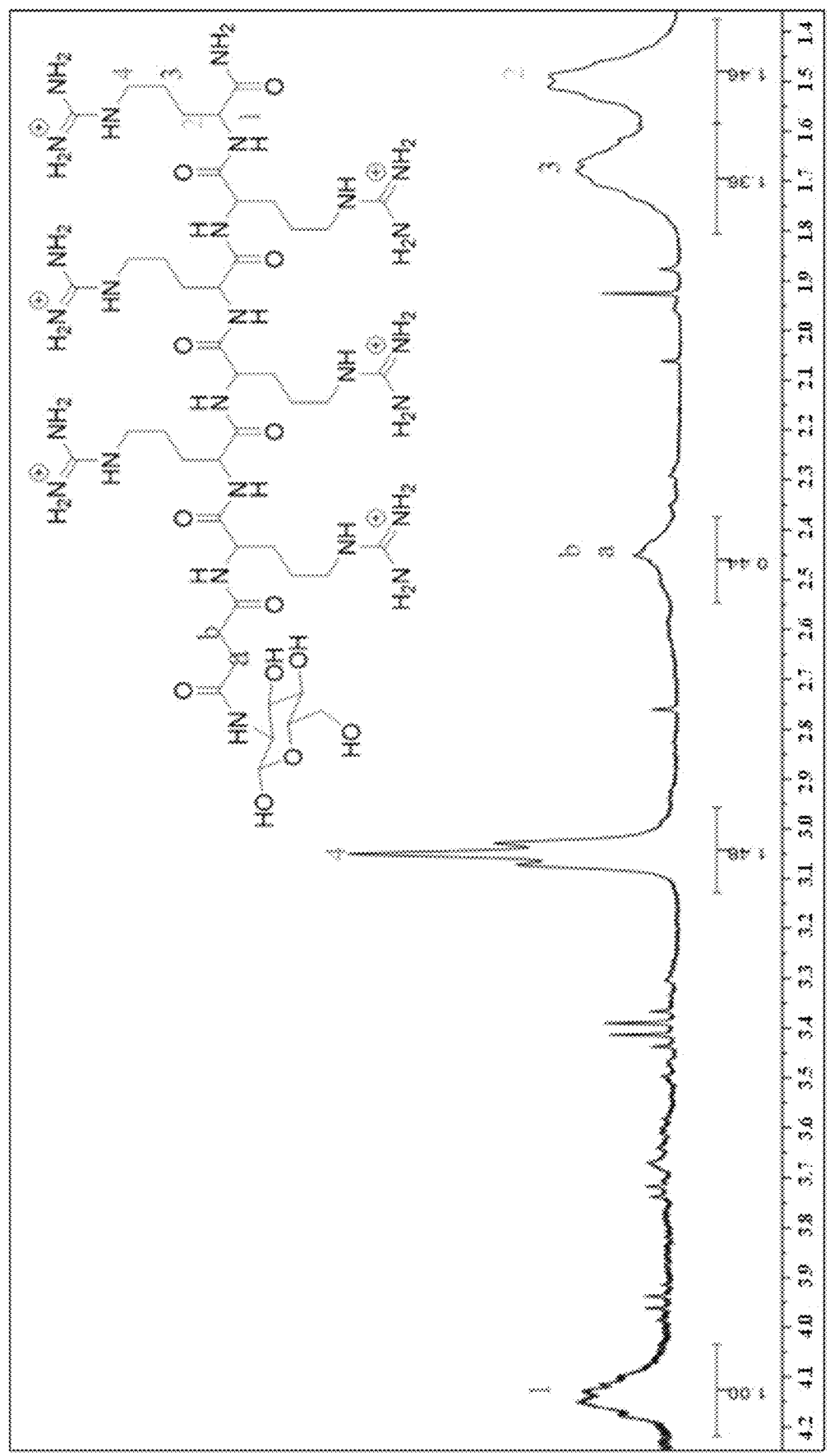
FIG. 4A is a $^1$H-NMR spectrum of a glucosamine derivative (RRRRRR, SEQ ID NO: 3) of an embodiment according to the present invention.

$^1$H-NMR (300 MHz, D$_2$O) δ4.15 (m, 5H), δ3.05 (t, 12H), δ2.45 (m, 4H), δ1.68 (m, 12H), 1.5 (m, 12H) (as shown in FIG. 4A).

Figure 4B:
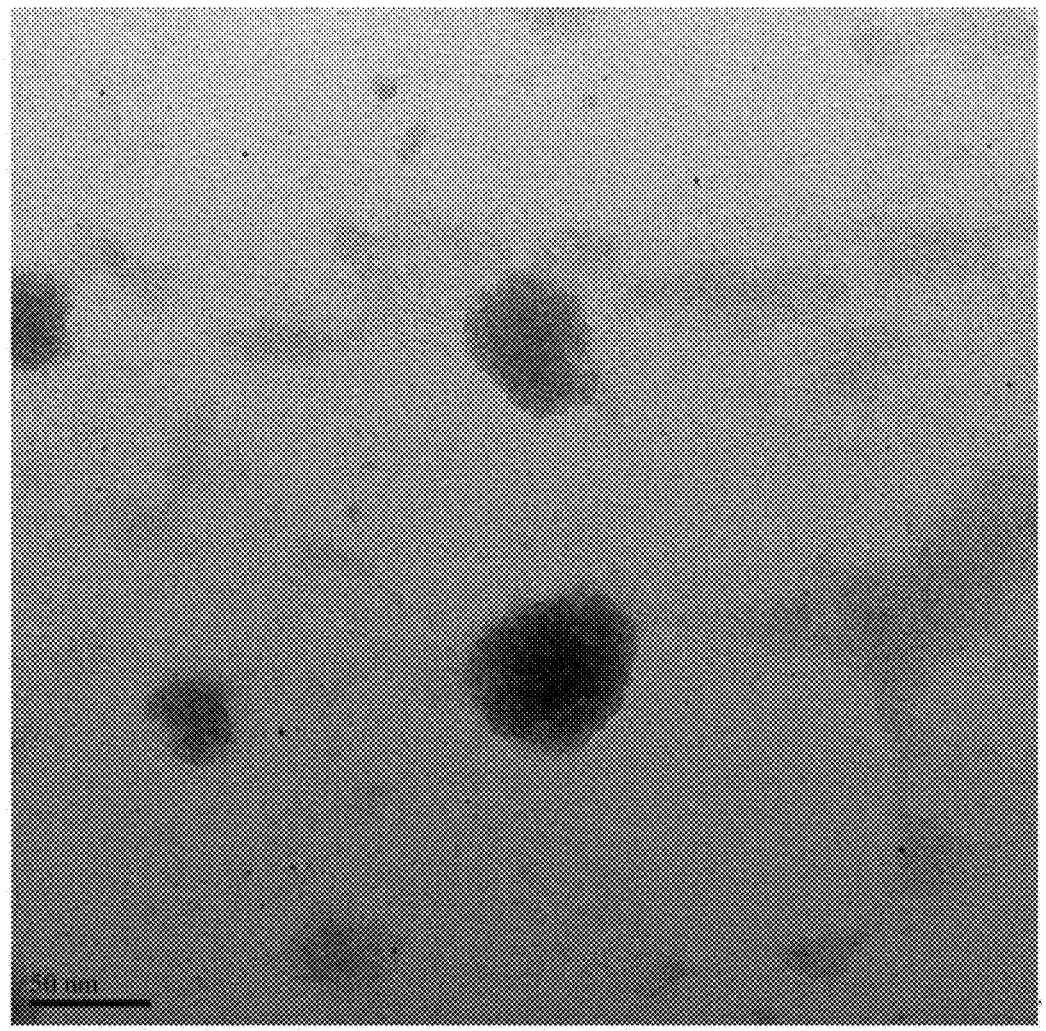
FIG. 4B is a transmission electron microscope (TEM) image of a glucosamine derivative (RRRRRR, SEQ ID NO: 3) of an embodiment according to the present invention.

Lastly, dissolve 1 mg glucosamine derivative in 4 ml deionized water and inject 1 ml alcohol (95%) by using a 18 G syringe. Then the mixed solution is vibrated by an ultrasonic vibrator (probe ultrasonic vibration) at 42 W for 10 minutes to produce glucosamine derivative nanoparticles (the RRRRRR(SEQ ID NO: 3) with particle size of 480-610 nm). First use an optical microscope for primary assessment and then use transmission electron microscope (TEM) to verify production of the glucosamine derivative. The result of observation is shown in FIG. 4B.

The glucosamine derivative nanoparticles (KTTKS(SEQ ID NO: 1), CRGDS(SEQ ID NO: 2), or RRRRRR(SEQ ID NO: 3)) can be used independently or used for carrying with a specified ingredient to pass through stratum corneum of skin or enter cells.

Take the cell as an example. The glucosamine derivative nanoparticles have specific interactions with the cell by the peptide thereof and the specific interactions can be connection with specific surface receptors, electric charge attractions, changes in hydrophobicity, etc. for allowing the glucosamine derivative nanoparticles themselves or with the specific ingredient (such as glucosamine salt) to enter the cell (such as skin cell, but not limited to the skin cell, other cells such as intestinal epithelial cell which can absorb nanoparticles can also be used). Thereby cellular uptake of the glucosamine is improved.

As to the connection with specific surface receptors, the CRGDS(SEQ ID NO: 2) can recognize specific receptors on surface of cancer cells and then connect with those specific receptors. The peptide works through the electric charge attraction when the peptide carries positive charges (such as RRRRRR(SEQ ID NO: 3)). The glucosamine derivative nanoparticles are attached to a surface of cell membrane and probability of drugs engulfed by the cell is increased because most of the cell membrane carries negative charges. The last one, changes in the hydrophobicity is achieved by using the selected peptide of the present invention to modify conventional hydrophilic drug which can't cross the cell membrane easily (since the cell membrane is formed by phospholipid). Thus the glucosamine derivative nanoparticles of the present invention can be connected with the cell membrane more easily.

Take the stratum corneum (horny layer) as an example. After changing the hydrophobicity of the glucosamine derivative nanoparticle by its feature (the peptide), the glucosamine derivative nanoparticle itself (or with the specific ingredient such as the glucosamine salt) can penetrate the stratum corneum due to modification by the lipophilic peptide. Thereby the skin permeability of the glucosamine is increased.

Once the specific ingredient is more oil soluble, it can be dissolved in alcohol in advance and then produced into the glucosamine derivative nanoparticles by which the oil soluble specific ingredient is encapsulated, the same as the above step S2. If the specific ingredient is water soluble, the water soluble specific ingredient and the glucosamine derivative are both dissolved in the deionized water, as mentioned in the above step S1, and then the glucosamine derivative nanoparticles by which the water soluble specific ingredient is encapsulated are prepared by the above step S2.

The related experimental data are as follows.

1. Encapsulation Rate of the Glucosamine Salt

Dissolve 1 mg the glucosamine derivative (KTTKS(SEQ ID NO: 1), CRGDS(SEQ ID NO: 2), or RRRRRR(SEQ ID NO: 3)) in 4 ml glucosamine salt aqueous solution (0.25 mg/ml) and put solution formed into a sample bottle. Then inject 1 ml alcohol (95%) quickly by using a 18 G syringe and vibrate the mixed solution by an ultrasonic vibrator (probe ultrasonic vibration) at 42 W for 10 minutes (5 minutes for CRGDS) to produce glucosamine derivative nanoparticles (KTTKS(SEQ ID NO: 1), CRGDS(SEQ ID NO: 2), or RRRRRR(SEQ ID NO: 3)) with the glucosamine salt encapsulated therein.

Take and place 5 ml glucosamine derivative nanoparticles solution into a centrifugal tube and centrifuge at 6,000 rpm, 4° C. for 30 minutes. Then take supernatant and use HPLC together with RI for quantitation of glucosamine and calculate the encapsulation rate of the nanoparticles.

First, prepare 0.03125 mg/ml, 0.0625 mg/ml, 0.125 mg/ml, 0.25 mg/ml and 0.5 mg/ml aqueous solution of the glucosamine salt and use alcohol as mobile phase under the analysis condition that the mobile phase 95% ethanol:$H_2O$=1:4 and flow rate 1 ml/min. Withdraw 0.4 ml standard solution by using micro-syringe and inject the standard solution into HPLC column. Similarly, also withdraw 0.2 ml sample (C2: concentration of the glucosamine in the supernatant after centrifugation) with micro-syringe and inject the sample into HPLC column. The mobile phase is prepared by 95% ethanol:$H_2O$=1:4. Definite integrals obtained after sample analysis are put into the calibration curve and use the equation, ER (%) (C1-C2)/C1*100%, to calculate the encapsulation rate (ER) of the glucosamine derivative nanoparticles. The results are shown in table 1. C1 is original concentration of glucosamine in the sample solution before encapsulation. C2: concentration of glucosamine in the supernatant after centrifugation.

TABLE 1 encapsulation rate of glucosamine derivative nanoparticles with different peptides

|  | Glu-SA-KTTKS | Glu-SA-CRGDS | Glu-SA-RRRRRR |
|---|---|---|---|
| encapsulated concentration (mg/mL) | 0.25 | 0.25 | 0.25 |
| concentration in supernatant (mg/mL) | 0.206 | 0.192 | 0.144 |
| encapsulation rate (%) | 17% | 23.3% | 42.5% |

The results show that the glucosamine derivative nanoparticles according to the present invention can be used as carriers to carry more glucosamine salt. Among them, Glu-SA-RRRRRR provides the best effect, up to 42.5%.

Since the glucosamine end of the glucosamine derivative nanoparticle includes quite a few —OH groups, a particle size analyzer, Malvern Zetasizer Nano-ZS90Y is used to detect whether these —OH groups can have hydrogen bonded with unmodified glucosamine salt and thus more glucosamine salts are further carried. The analysis results are shown in the following table 2.

TABLE 2 measurement of changes in particle size of glucosamine derivative nanoparticle by Zeta coefficient

|  | encapsulated glucosamine salt | time | particle size (nm) |
|---|---|---|---|
| Glu-SA-KTTKS | NO | 3 hours | 827.23 ± 123.51 |
|  | NO | 1 day | 1023.13 ± 244.22 |
|  | YES | 3 hours | 588.47 ± 78.48 |
|  | YES | 1 day | 603.53 ± 38.10 |
| Glu-SA-CRGDS | NO | 3 hours | 782.90 ± 38.98 |
|  | NO | 1 day | 283.53 ± 39.55 |
|  | YES | 3 hours | 881.03 ± 120.61 |
|  | YES | 1 day | 355.20 ± 92.86 |
| Glu-SA-RRRRRR | NO | 3 hours | 545.10 ± 64.76 |
|  | NO | 1 day | 699.70 ± 208.90 |
|  | YES | 3 hours | 784.37 ± 94.24 |
|  | YES | 1 day | 413.41 ± 128.28 |

The results show that particle size of the present glucosamine derivative nanoparticles (the CRGDS(SEQ ID NO: 2) and the RRRRRR(SEQ ID NO: 3)) by which the additional glucosamine salt is encapsulated is respectively increased from 782 nm and 545 nm to 881 nm and 784 nm. Except original changes of the particle size with time, the results approve that the present glucosamine derivative nanoparticles can be connected with the unmodified glucosamine salt additionally. The above changes in the particle size show that the glucosamine derivative nanoparticles can be connected with the specific ingredient by hydrogen bonding or intermolecular force (except hydrogen bonding) to form a carrier with novel structure for delivery.

2. Experiment Related to Cell Penetration Ability

During preparation of the glucosamine derivative nanoparticles, first dissolve the glucosamine derivative (1 mg) in a fluorescent dye-rhodamine 0.25 mg/ml and then use to prepare the glucosamine derivative nanoparticles.

Cell culture: add immortalized human keratinocyte cell line (HaCaT) to a petri dish with Dulbecco's modified Eagle's medium (DMEM) high glucose containing 10% fetal bovine serum (FBS) and 1% Penicillin/Streptomycin and then incubate in a constant temperature incubator at 37° C., 5% $CO_2$ for 24 hours. Remove culture medium in the petri dish and wash the cells 3 times with Phosphate buffered saline (PBS). After removal of liquid, add trypsin-EDTA and incubate in the constant temperature incubator at 37° C., 5% $CO_2$ for 3-5 minutes to dissociate cells. Next transfer cell suspension into a 15 ml centrifuge tube and centrifuge at 3000 rpm for 3 minutes. After removal of supernatant, add 6 ml DMEM. Take a 6 well cell culture plate and place a cover slip in each of the wells. Then add 1 ml solution containing the cells and 2 ml DMEM into the respective wells and incubate in the constant temperature incubator at 37° C., 5% $CO_2$.

After 24 hours, observe cell growth by microscope and confirm that the amount of the cells at four corners and a center area of the cover slip is at least 70%. Remove the culture medium in the respective wells and wash twice with PBS. Then transfer the cover slip into another clean and sterile 6 well plate, add the glucosamine derivative nanoparticles with rhodamine, and place in the constant temperature incubator for 4 hours. Remove the culture medium in the well plate, wash the cells with PBS, and remove the liquid. Then add PBS containing 4% paraformaldehyde to fix the cells for 10 minutes. Remove liquid and wash with PBS. Then add 0.2% triton X-100 and keep protected from light to react for 5 minutes. After removal of the liquid and washing the cells with PBS, add 4',6-diamidino-2-phenylindole (DAPI) and keep protected from light to react for 5 minutes for staining cell nucleus (with blue-violet fluorescence P). After removal of the liquid and washing the cells with PBS, transfer the cover slip to a glass slide and observe the cells with a fluorescence microscope.

Figure 5A:
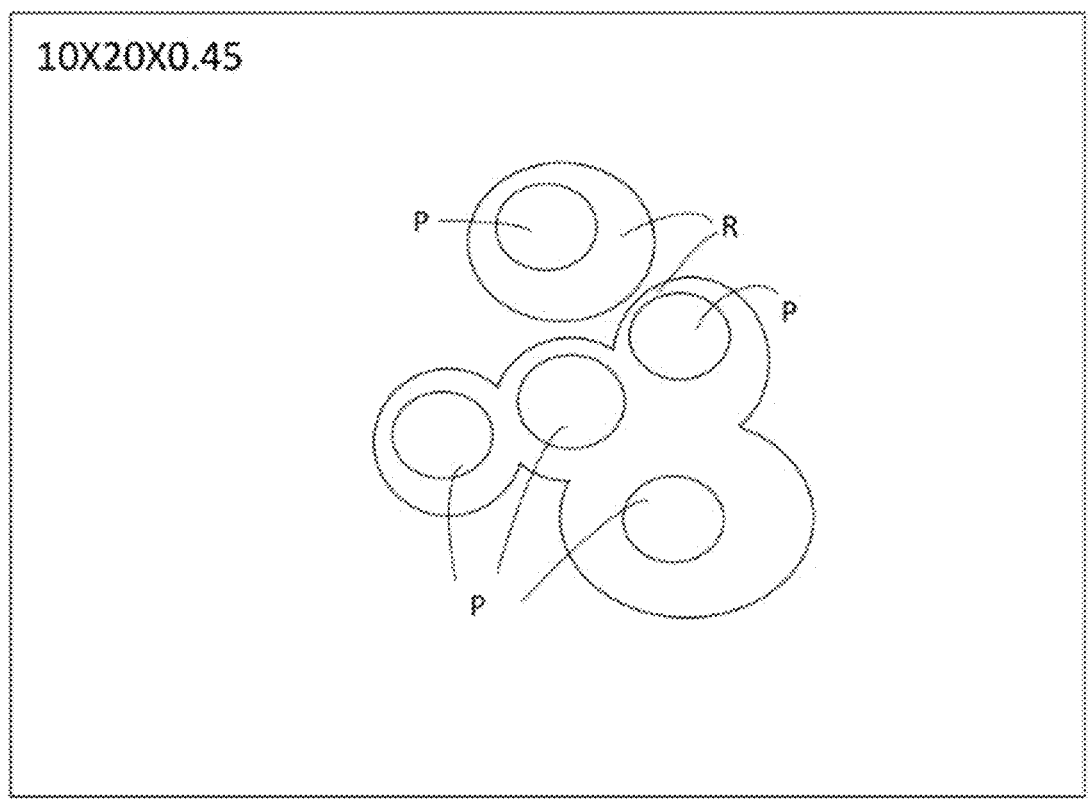
FIG. 5A is an image showing penetration of the glucosamine derivative nanoparticles (KTTKS, SEQ ID NO: 1) of an embodiment according to the present invention.
Figure 5B:
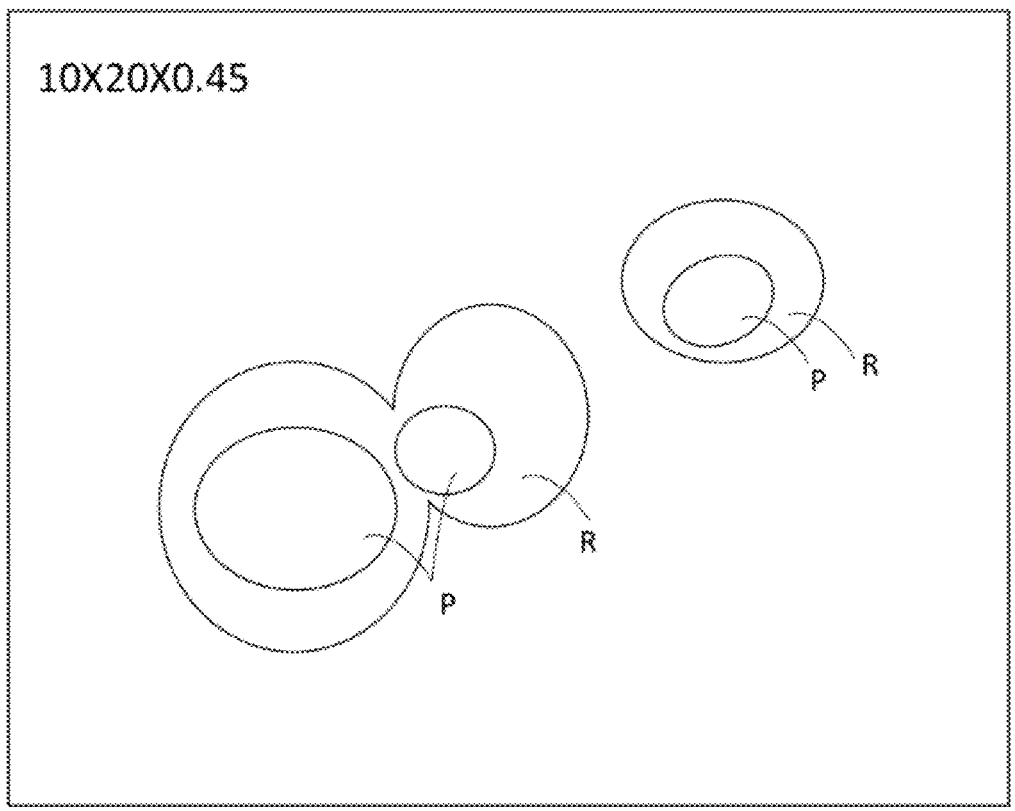
FIG. 5B is an image showing penetration of the glucosamine derivative nanoparticles (CRGDS, SEQ ID NO: 2) of an embodiment according to the present invention.
Figure 5C:
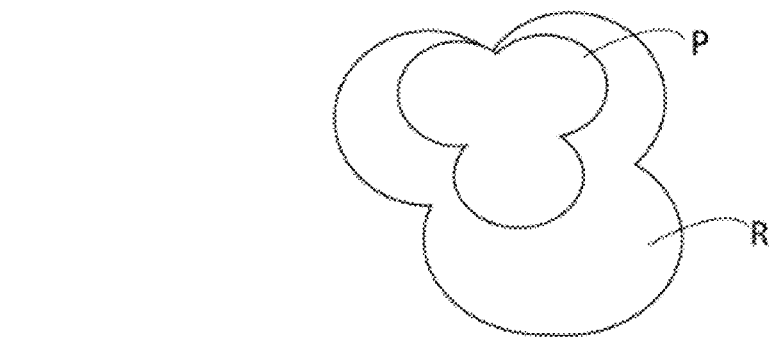
FIG. 5C is an image showing penetration of the glucosamine derivative nanoparticles (RRRRRR, SEQ ID NO: 3) of an embodiment according to the present invention.
Figure 5C:
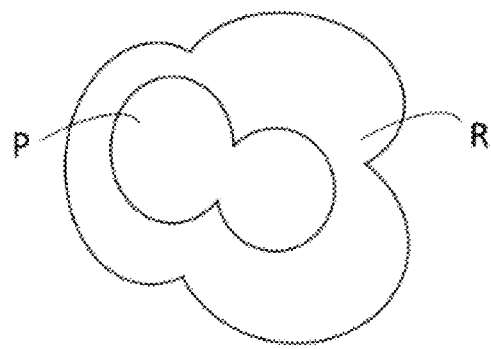

After being incubated for 4 hours, use an optical microscope and a fluorescent microscope to observe the cells. As shown in FIG. 5A-5C (magnification: 10×20×0.45, scale bar-10 μm), these are images showing penetration of the glucosamine derivative nanoparticles (KTTKS, SEQ ID NO: 1)/(CRGDS, SEQ ID NO: 2)/(RRRRRR, SEQ ID NO: 3) of the present invention. FIG. 5A, FIG. 5B, and FIG. 5C are respectively images of Glu-SA-KTTKS, Glu-SA-CRGDS, and Glu-SA-RRRRRR. After being encapsulated in the glucosamine derivative nanoparticles, rhodamine can enter the cell effectively because red fluorescence materials R (rhodamine) is obviously observed in cytoplasm of the cells. The images confirm that the present glucosamine derivative nanoparticles can not only enter the cells but also use as carriers to deliver the specific ingredient into the cell and accumulate in the cell. The specific ingredient can be medicine, functional ingredients, not limited to the glucosamine while the cell can be skin cells (but not limited to the skin cell) and other cells such as intestinal epithelial cell which absorbs nanoparticles can also be used.

3. Cell Cytotoxicity Test (Using HaCaT as an Example).

HaCaT cells are seeded into a 96 well plate at $10^5$ cells/well. After attachment overnight, remove culture medium. The frozen peptide (KTTKS(SEQ ID NO: 1), CRGDS(SEQ ID NO: 2), and RRRRRR(SEQ ID NO: 3)) and the glucosamine derivative nanoparticles are respectively dissolved in serum-free medium (SFM) again (final concentration 1,000 ppm). Use SFM to carry out serial dilution and get concentrations of 500 ppm, 250 ppm, and 125 ppm. Then add 100 µl samples with different concentrations into the well plate (repeat four times and a group of samples added with SFM used as control group). After being cultured for 24 hours, remove culture medium and add 10 µl CCK-8 and 100 µl PBS into each of the wells. Then react at 37° C. for 2-3 hours and read absorbance at 450 nm. Cell viability is defined as a percentage of the absorbance of the respective test groups relative to the absorbance of the control group while the cell viability of the control group is set as 100%.

Figure 6:
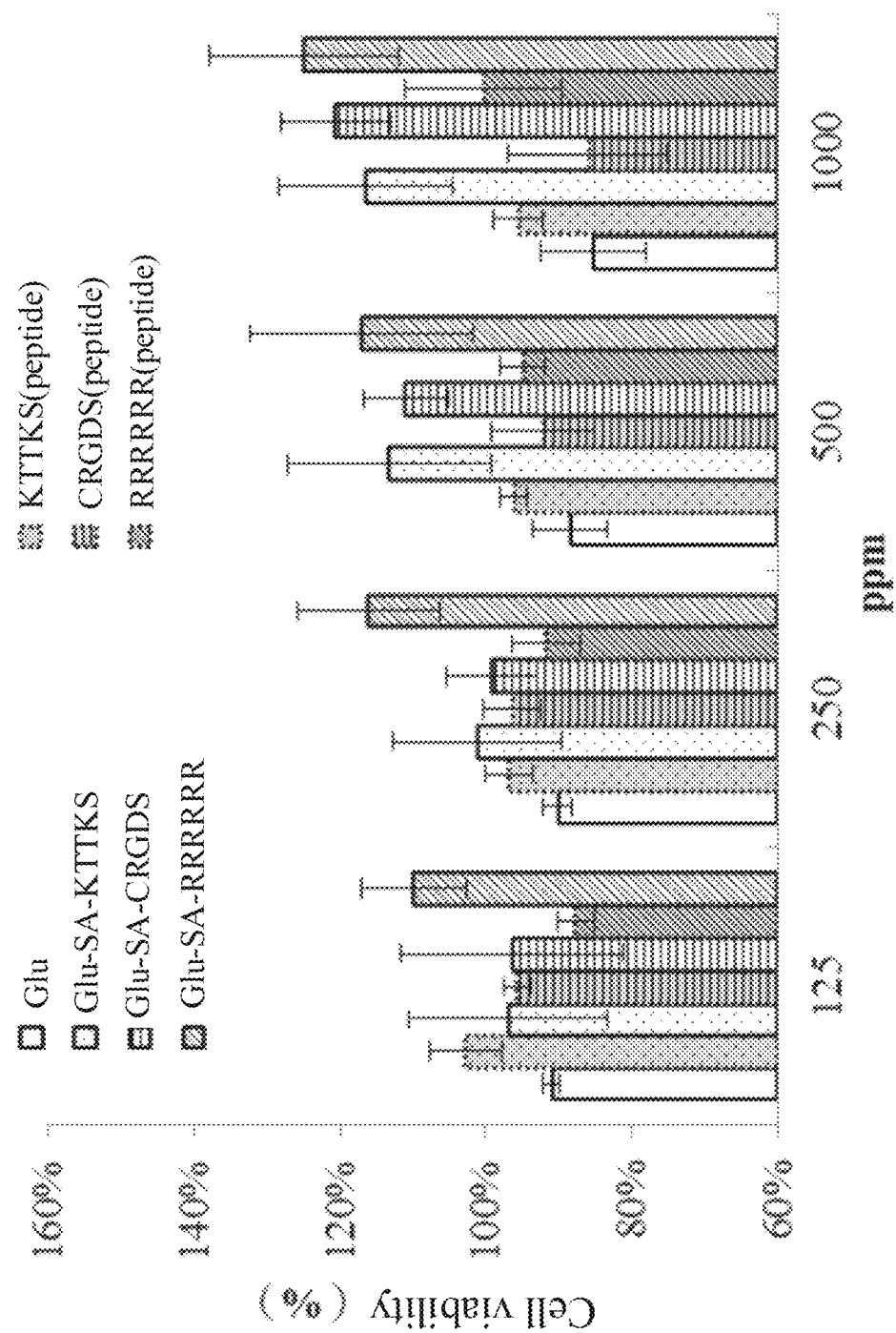
FIG. 6 shows results of cell cytotoxicity test of an embodiment according to the present invention.

Refer to FIG. 6, it is learned that the cell viability is reduced a bit along with the increasing glucosamine concentration. Yet the cell viability of the present glucosamine derivative nanoparticles (Glu-SA-KTTKS, Glu-SA-CRGDS, Glu-SA-RRRRRR) is increased along with the increasing concentration (ppm) added. This means modification of the glucosamine by the peptide has changed its properties and effects on the cells.

4. Toxicity Test (Using Zebrafish Embryos to Test their Toxic Effects on Organisms)

Place zebrafish into a low temperature incubator/fish tank (28° C.) on a 14-hour light and 10-hour dark cycle and feed dry food two times per day. During light cycle of one day before collection of zebrafish fertilized eggs, larva is fed with dry food and powder of decapsulated brine shrimp eggs alternately each two hours for providing sufficient nutrition to the zebrafish.

Figure 7:
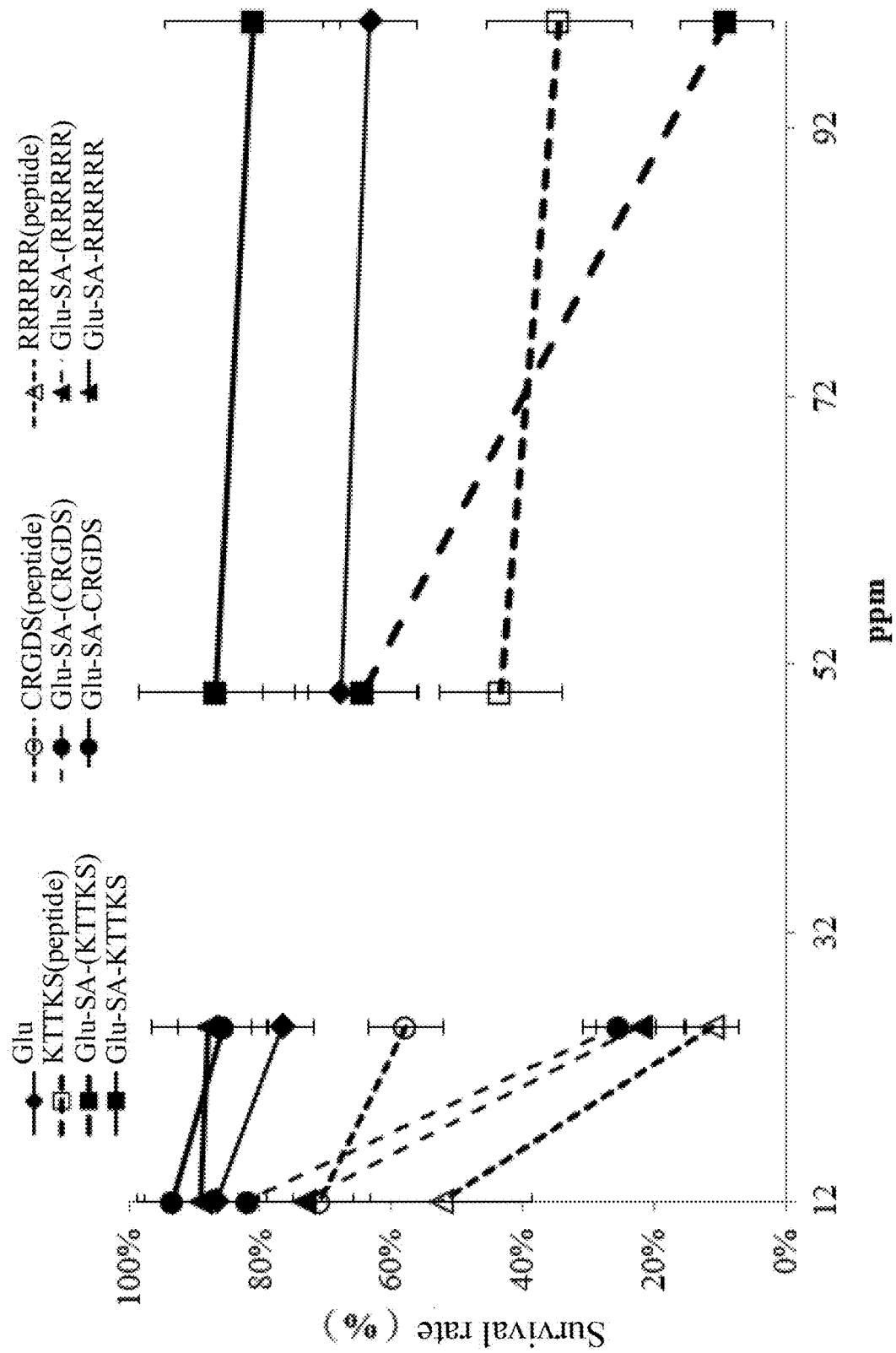
FIG. 7 shows test results of toxic effects of an embodiment on organisms according to the present invention.

Use 0 hpf (hours post-fertilization) zebrafish larvae for drug testing. Put zebrafish into a 6 well culture plate (30 larvae/each well and repeat three times). After removal of aerated water in the 6 well culture plate, resuspend lyophilized powder of the glucosamine salt (Glu), the peptide (KTTKS(SEQ ID NO: 1), CRGDS(SEQ ID NO: 2), RRRRRR(SEQ ID NO: 3)), the glucosamine derivative (Glu-SA-(KTTKS), Glu-SA-(CRGDS), Glu-SA-(RRRRRR)), and the glucosamine derivative nanoparticle (Glu-SA-KTTKS, Glu-SA-CRGDS, Glu-SA-RRRRRR) in deionized water and add 3 ml resuspension into the culture plate. Protect from light and incubate at low-temperature incubator at constant temperature. Then drain the liquid in the 6 well culture plate after 24 hours and dispense clean aerated water into the 6 well culture plate immediately. Next calculate survival rate of the larva and test results are shown in FIG. 7.

After formation of the nanoparticle, the glucosamine is encapsulated therein while a part of the peptide exposed outside helps the nanoparticles go through the cells. Thus survival rate of the zebra embryo is increased to 81% (100 ppm), 86% (50 ppm), and 88% (50 ppm) under the same concentration. Thus the present glucosamine derivative nanoparticle has lower cytotoxicity on the organism.

In summary, the present glucosamine derivative which is obtained by glucosamine modified by succinic anhydride and connected with the peptide having penetration ability is self-assembled with alcohol to form the nanoparticles. By the nanoparticle form and cell-penetrating peptide, the glucosamine derivative nanoparticles not only can be easily absorbed by the stratum corneum of the skin but also can pass through the cells to be absorbed. Thereby the present glucosamine derivatives have higher absorption compared with the conventional glucosamine with poor and limited absorption.

Moreover, the glucosamine derivative nanoparticles according to the present invention can also be used as carriers for carrying and delivering specific ingredients required (such as glucosamine salt) to cells or the stratum corneum to be absorbed under condition that the glucosamine derivative nanoparticles have no toxic effects on the cells and organisms.

Compared with glucosamine available now on the market, the glucosamine derivative nanoparticles according to the present invention have higher absorption, without having toxic effects on organisms/cells. A good absorption rate of the glucosamine is achieved no matter the glucosamine is applied by oral administration or being spread on skin.

SEQUENCE LISTING

```
Sequence total quantity: 3
SEQ ID NO: 1            moltype = AA   length = 5
FEATURE                 Location/Qualifiers
source                  1..5
                        mol_type = protein
                        organism = synthetic construct
SEQUENCE: 1
KTTKS                                                                   5

SEQ ID NO: 2            moltype = AA   length = 5
FEATURE                 Location/Qualifiers
source                  1..5
                        mol_type = protein
                        organism = synthetic construct
SEQUENCE: 2
CRGDS                                                                   5

SEQ ID NO: 3            moltype = AA   length = 6
FEATURE                 Location/Qualifiers
source                  1..6
                        mol_type = protein
                        organism = synthetic construct
SEQUENCE: 3
RRRRRR                                                                  6
```

The invention claimed is:

1. A glucosamine derivative nanoparticle, the glucosamine derivative nanoparticle is formed by self-assembly of a glucosamine derivative with alcohol;
wherein the glucosamine derivative is formed by using a succinic anhydride connected with an amino end of a glucosamine to react with an amino end of a peptide; wherein chemical formula of the glucosamine derivative is as follows:

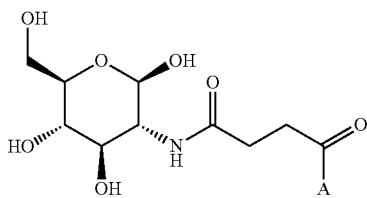

wherein A is the peptide which is composed of 5-6 amino acids and selected from the group consisting of a Lys-Thr-Thr-Lys-Ser (SEQ ID NO: 1), a Cys-Arg-Gly-Asp-Ser (SEQ ID NO: 2), and a Hexaarginine (SEQ ID NO: 3).

2. The glucosamine derivative nanoparticle as claimed in claim 1, wherein a specific ingredient is encapsulated in the glucosamine derivative nanoparticle and the specific ingredient is a glucosamine salt.

3. The glucosamine derivative nanoparticle as claimed in claim 1, wherein a particle diameter of the glucosamine derivative nanoparticle is ranging from 400 nm to 1000 nm.

4. A method of preparing glucosamine derivative nanoparticles comprising the steps of:
dissolving a glucosamine derivative in deionized water to form a glucosamine derivative aqueous solution; and
mixing alcohol with the glucosamine derivative aqueous solution to get a mixed solution and vibrating the mixed solution by an ultrasonic vibrator with a power of 40-50 W for 5-10 minutes to get glucosamine derivative nanoparticles;
wherein the glucosamine derivative is formed by using a succinic anhydride connected with an amino end of a glucosamine to react with an amino end of a peptide; wherein chemical formula of the glucosamine derivative is as follows:

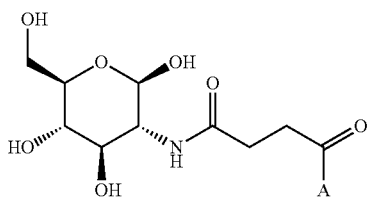

wherein A is the peptide which is composed of 5-6 amino acids and selected from the group consisting of a Lys-Thr-Thr-Lys-Ser (SEQ ID NO: 1), a Cys-Arg-Gly-Asp-Ser (SEQ ID NO: 2), and a Hexaarginine (SEQ ID NO: 3).

5. The method as claimed in claim 4, wherein before the step of dissolving a glucosamine derivative in deionized water, the method further includes the steps of:
adding glucosamine and succinic anhydride into dimethylformamide (DMF) aqueous solution and N-methylmorpholine at room temperature to react and performing vacuum filtration after reaction to form glucosamine-succinic anhydride;
adding glucosamine-succinic anhydride and peptide separately into DMF to mix and react at room temperature and get yellow precipitate; and
performing suction, filtration, and centrifugation on the yellow precipitate to get the glucosamine derivative.

6. The method as claimed in claim 4, wherein the step of dissolving a glucosamine derivative in deionized water further includes a step of adding a glucosamine salt into the deionized water in advance.

7. A method for using glucosamine derivative nanoparticles to prepare a carrier carrying a specific ingredient to enter a cell or a stratum corneum, the method comprising the steps of:
getting the glucosamine derivative nanoparticles formed by a glucosamine derivative; and alcohol; and
carrying the specific ingredient by using the glucosamine derivative nanoparticles to enter the cell or the stratum corneum;
wherein the glucosamine derivative is formed by using a succinic anhydride connected with an amino end of a glucosamine to react with an amino end of a peptide; wherein chemical formula of the glucosamine derivative is as follows:

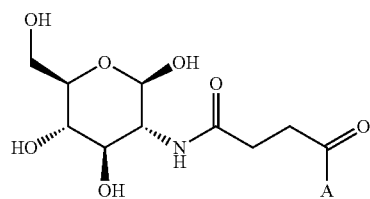

wherein A is the peptide which is composed of 5-6 amino acids and selected from the group consisting of a Lys-Thr-Thr-Lys-Ser (SEQ ID NO: 1), a Cys-Arg-Gly-Asp-Ser (SEQ ID NO: 2), and a Hexaarginine (SEQ ID NO: 3); wherein the glucosamine derivative nanoparticles enters the cell by a mechanism selected from the group consisting of recognition of specific receptors on surface of the cell by the peptide of the glucosamine derivative, electric charge attractions, and changes in hydrophobicity, and the glucosamine derivative nanoparticle enters the stratum corneum by changes in hydrophobicity.

8. The method as claimed in claim 7, wherein the specific ingredient is a glucosamine salt.

* * * * *